United States Patent Office 3,300,203
Patented Jan. 24, 1967

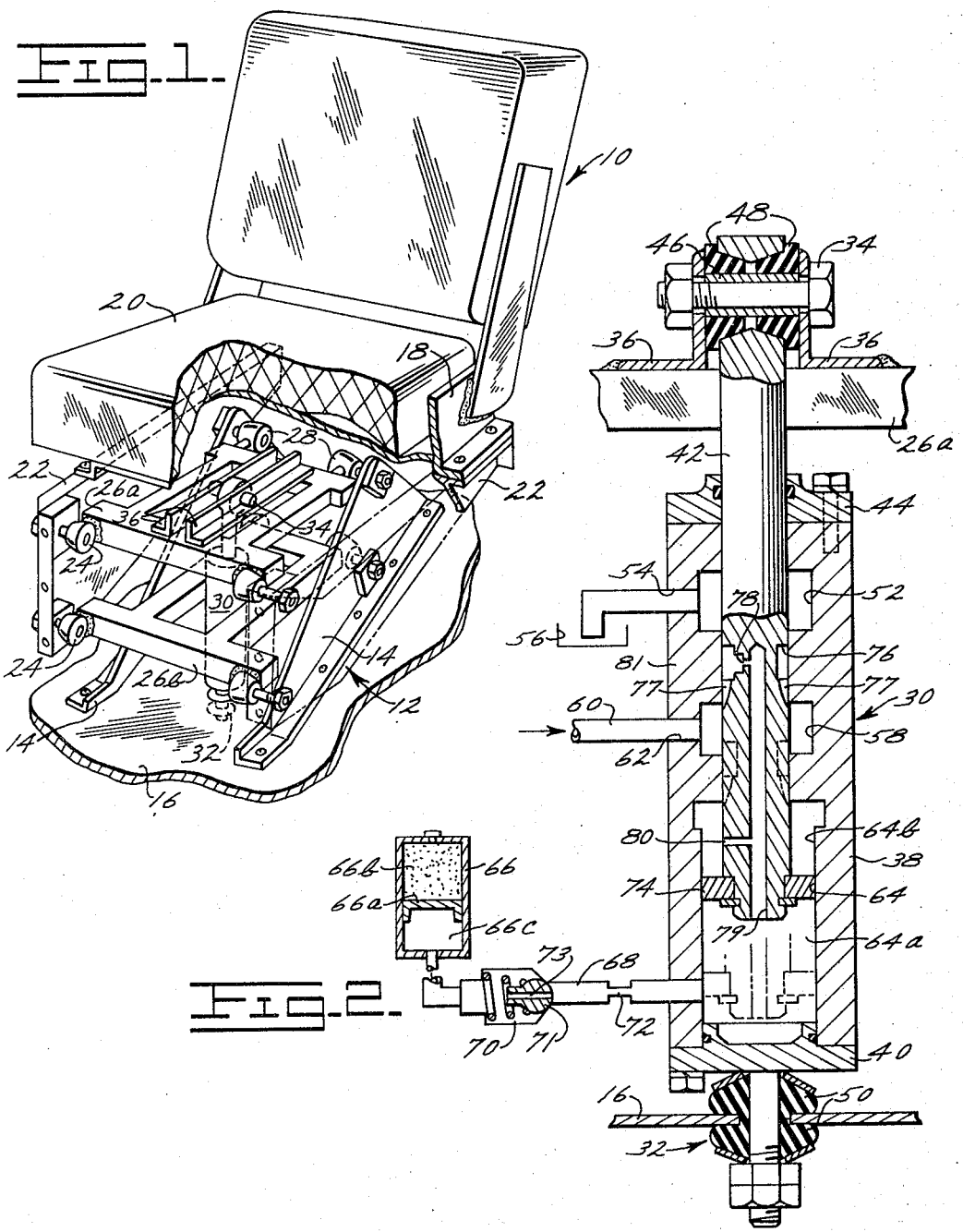

3,300,203
HYDROPNEUMATIC SEAT SUSPENSION
John W. Carter, Peoria, and Jackson C. Medley and James P. Mueller, East Peoria, Ill., assignors to Caterpillar Tractor Co., Peoria, Ill., a corporation of California
Filed Apr. 12, 1965, Ser. No. 477,495
6 Claims. (Cl. 267—1)

This invention relates to a seat supporting device and more particularly to a supporting device which utilizes pressurized fluid for resiliently supporting a seat.

In an effort to maintain the alertness and physical wellbeing of the operator of vehicles, especially the type used in heavy construction, increasingly greater attention is being paid to operator comfort. It has been found that the performance level of operators over a long period of time is seriously affected if they are subjected to constant bouncing. In solving this problem, continuing efforts are being made in providing improved suspension systems for the vehicles themselves and for the seat occupied by the operator.

Ideally, the seat suspension should operate to isolate the operator from the truck body vibrations and should also assume an elevation with respect to the floor of the cab which would position the operator correctly to insure easy access to the various controls.

In providing a solution to these problems, this invention incorporates a seat suspension apparatus having telescopingly arranged members which are in communication with and control the admission and discharge of pressurized hydraulic oil which tends to maintain a particular positional relationship between such members. Upon relative movement of the telescoping members, which occurs during the bouncing motion of the truck body, the telescoping members control the flow of the hydraulic oil to a pair of tandem chambers one of which is connected to an accumulator having an expansible chamber charged with gaseous fluid. As the chamber connected to the accumulator decreases in volume, which is brought about when the truck negotiates a bump, hydraulic oil is discharged to the accumulator thereby compressing the gaseous fluid. This action progressively increases the resistance between the telescoping members thus providing a suspension having a low spring rate.

Accordingly, it is an object of this invention to provide a new and improved hydropneumatic seat suspension device.

Another object of this invention is to provide a seat supporting structure which assumes a predetermined elevation regardless of the weight of the operator occupying the seat.

Another object of this invention is to provide a seat suspension apparatus whose displacement in response to an exciting force is very low.

These and other objects of the invention will become more apparent upon consideration of the following detailed description of the preferred embodiment thereof when taken in conjunction with the following drawing in which:

FIG. 1 is a perspective view of a seat and its supporting structure constructed according to this invention;

FIG. 2 is a diagrammatic view showing the seat supporting strut in longitudinal section and the associated accumulator.

Referring now to FIG. 1, it will be seen that the seat constructed according to the invention is generally indicated by the numeral 10 and it includes a support frame structure 12 including a pair of laterally spaced generally triangular plates 14 which are rigidly secured to the floor plate 16 of a truck cab. A framework 18, within which the cushion 20 is located, is connected to a pair of laterally spaced depending plates 22 which carry rotary coupling members 24 which are suitably attached to upper and lower frame structures 26a and 26b, respectively. Similar rotary coupling members 28 are also secured to the rearward ends of the frame structures 26a and 26b and to the plates 14. The structures 26a and 26b define a parallel linkage which permits the seat to move upwardly and downwardly while maintaining a fixed orientation with respect to the floor plate 16.

Resilient support for the seat structure is provided by a supporting strut 30 which has its lower end secured to the plate 16 as indicated at 32 and is pivotally connected to the frame structure 26a by means of a transverse pivot 34 extending through a pair of laterally spaced angle irons 36 which are rigidly secured to the frame structure 26a in a suitable manner. The supporting strut 30 is connected to a supply of hydraulic fluid under pressure and is designed to perform three basic functions. In the first place, the strut positions the seat to a maximum height when it is unoccupied with such height being chosen to enable the operator to seat himself properly without being too close to the steering wheel. Secondly, the strut enables the seat to assume a desired distance above the plate 16 regardless of the weight of the operator thus obviating adjustments by the operator. And, thirdly, the suspension strut 30 provides a very low spring rate for the seat.

Now referring to FIG. 2, it will be seen that the supporting strut 30 comprises a tubular body 38, sealed at its lower end by a cap 40, and a reciprocable valve rod 42 extending through a bored cap 44 suitably rigidly mounted on its upper end. The pivot pin 34, preferably a conventional bolt, extends through a bushing 46 which is in turn associated with a pair of rubber grommets 48 thereby constituting a resilient joint between the angle iron 36 and the valve rod 42. In a similar manner the lower end of the supporting strut is resiliently connected to the plate 16 by suitable rubber grommets 50.

The interior of the tubular body 38 is formed with an upper groove 52 provided with a port 54 for exhausting pressurized hydraulic fluid to the schematically illustrated tank 56. An intermediate groove 58 is in communication with a source of hydraulic fluid under pressure which is communicated thereto by the conduit 60 connected to a port 62. The lower end of the body is formed with a longitudinally elongated chamber 64 which is connected to an accumulator 66 by a conduit 68 having a dual rate orifice-type check valve 70 and an orifice 72 located therein. The lower end of the valve rod 42 has a piston member 74, fixed thereon in any suitable manner, which divides the chamber 64 into a lower pressure chamber 64a and an upper throttle chamber 64b.

Pressure fluid admitted to the groove 58 by the conduit 60 is communicated to the chamber portions 64a and 64b in response to the relative movement between the body 38 and the valve rod 42. As shown in FIG. 2, the valve rod is formed with a groove 76 and metering slots 77 which communicate with a transverse orifice 78. A central bore 79 extending downwardly to the end of the rod 42 conducts hydraulic fluid admitted through the orifice 78 to the pressure chamber 64a. Another orifice 80 conducts fluid from the bore 79 to the throttle chamber 64b. The grooves 52 and 58 are separated by a land 81 which is of sufficient axial length to completely block communication of the orifice 78 with these grooves. But upon relative movement between the body 38 and the rod 42 causing registration of the metering slots 77 or these slots and the groove 76 with the groove 58, hydraulic fluid under pressure is conducted to the chambers 64a and 64b by the orifice 78, the bore 79, and the orifice 80. During such times the reciprocation of the rod relative to the body 38 is of low amplitude; the metering slots are effective to reduce the quantity of fluid discharged to the groove 76 and in this way prevent over correction.

The accumulator 66 is of the type including a piston 66a dividing the accumulator into an upper chamber 66b containing gas, preferably nitrogen, under a pressure at approximately 225 pounds per square inch, and a lower chamber 66c which receives hydraulic fluid from the chamber 64a. As will be seen in FIG. 2, the valve 70 includes a spring biased valve member 71 having an orifice 73 which permits flow of hydraulic fluid between the chambers 66c and 64a without displacement of the valve 71 against the bias of the spring. However, under conditions of high flow rate from the chamber 64a to chamber 66c the pressure difference across the orifice 73 creates a force sufficient to unseat the valve 71 and accordingly reduces the resistance to flow of oil.

When the system is primed with hydraulic oil, the valve rod 42 will be in the position illustrated in FIG. 2 since the pressure in the chamber 66b of the accumulator is transmitted by the piston 66a through the conduit 68 and to the chamber 64a providing sufficient force on the end of the valve rod 42 and the piston member 74 to overcome the static weight of the movable portions of the seat structure.

When the operator occupies the seat before the engine is running, the valve rod 42 moves downwardly approximately to the positon indicated in phantom outline during which time a portion of the fluid in the chamber 64a is throttled by way of the bore 79 and the orifice 80 into the upper chamber portion 64b. Since the amount of fluid displaced by the downward movement of the valve rod 42 is substantially greater than the increase in volume of the chamber 64b, the remainder of this fluid is forced through the conduit 68 into the accumulator chamber 66c causing upward movement of the piston 66a and compression of the gas in the chamber 66b.

After the engine has been started, hydraulic fluid at approximately 1200 p.s.i. is delivered to the intermediate groove 58 by the conduit 60 and this fluid flows through the orifice 78 since the annular groove 76 is at this time in registration with the groove 58. The fluid then flows down the bore 79 into the lower chamber portion 64a and to the chamber 66c of the accumulator through the conduit 68. Since the area against which the pressure is acting in the chamber portion 64a is greater than the area in chamber portion 64b, a net force urging the valve rod 42 upwardly results. Such movement continues until the groove 76 is located adjacent the land 81 thereby blocking communication between the supply conduit 60 and the groove 76. In the event the pressure in the chamber portion 64a is great enough to raise the valve rod a sufficient distance upwardly so that the groove 76 communicates with the upper groove 52 part of the fluid is exhausted to the tank 56 thus allowing the valve rod 42 to assume the position shown in FIG. 2.

Thus, according to the above described construction it will be appreciated that irrespective of the weight of the operator, the seat will assume an elevation locating the groove 76 adjacent the land 81.

When the vehicle is moving over a rather rough surface, an exciting force is transferred to the tubular body 38 by virtue of its connection to the deck plate 16. During such times that the exciting force moves the tubular body 38 upwardly relative to the valve rod 42, there is produced a rapid increase in pressure in the lower chamber portion 64a causing a portion of this fluid to be discharged through orifice 80 into the chamber portion 64b and the greater portion of this displaced fluid to be discharged into the chamber 66c of the accumulator. Relatively larger flow rates to the chamber 66c occur under these conditions since the valve member 71 is unseated due to the pressure difference created by the rapid rise in pressure. During such times that the amplitude of oscillation between the valve rod 42 and the tubular body 38 is rather minimal, flow of hydraulic fluid between the lower chamber 64a and the chamber 66c of the accumulator takes place through the orifices 72 and 73 without unseating the valve 71. Under these conditions, it will be apparent that the piston 66a is moved upwardly compressing the gas in the chamber 66b and accordingly progressively increasing the resistance to further movement of the piston rod relative to the tubular housing 38.

In addition to the resistance supplied by the accumulator 66, the fluid throttled to the upper chamber portion 64b through the orifice 80 has the effect of resisting the movement of the valve rod 42 relative to the tubular housing 38. This resistance to movement exists whether the valve rod 42 is moving upwardly or downwardly relative to the tubular housing 38.

It will be recalled that the groove 76 is adjacent the land 81 during such times that no relative movement exists between the valve rod 42 and the tubular body 38. But, as soon as the vehicle encounters a bump and the tubular body 38 moves upwardly relative to the valve rod 42, allowing pressure fluid supplied by the conduit 60 to again flow into the groove 76 and through the metering slot 77 since communcation between the groove 58 and the metering slot 77 is again established upon such relative movement. The fluid therefore flows through the orifice 78 and into the longitudinal bore 79 wherein it flows to the upper chamber 64b and the lower chamber portion 64a and this fluid further increases the resistance of downward movement of the valve rod 42 relative to the tubular body 38 when the vehicle is negotiating a bump urging the tubular body 38 upwardly.

When the operator dismounts from the seat, the valve rod 42 moves upwardly a distance sufficient to establish communication between the groove 76 and the exhaust groove 52 which discharges a portion of the fluid from the chambers 64a and 64b to the tank 56 by the conduit 54. This rise in elevation is of such a limited extent that it avoids following the operator as he rises to dismount.

In view of the above description, it will be seen that this invention provides a seat supporting strut which will maintain a predetermined elevation of the seat relative to its supporting surface and will oppose external forces tending to displace the seat from such elevation. In addition, by providing an accumulator of the type described in combination with the dual-rate orifice type check valve, sudden forces of high and low magnitude are effectively dissipated by the fluid and they are effectively attenuated so that the oscillations of the seat occupied by the operator are substantially reduced in amplitude.

We claim:

1. A hydropneumatic seat suspension strut comprising a first member secured to a rigid surface which is subjected to bouncing motion, a second member reciprocably mounted in said first member, said members being formed to provide at least one chamber which is connectible to a source of pressure fluid, cooperable means on said members for admitting and discharging pressure fluid to and from said one chamber respectively, means including an expansible chamber containing a gaseous fluid under pressure, said last mentioned means being connected to said one chamber by a conduit, and a valve mechanism in said conduit being operable to establish different values of flow rate of the pressure fluid from said one chamber to said last mentioned means, such valves of flow rate being dependent upon the rate of relative movement between said members.

2. A hydropneumatic seat suspension strut comprising a first member secured to a rigid surface which is subjected to bouncing motion, a second member reciprocably mounted in said first member, said members providing a pressure chamber which is connectible to a source of pressure fluid in response to the reciprocation of said members, means including expansible chambers one of which contains a gaseous fluid under pressure, said means having the other chamber connected to said pressure chamber by a conduit, and a valve mechanism in said conduit being operable to establish different values of flow rate of the pressure fluid from said pressure chamber to said other chamber of said means, such values of flow rate being dependent upon the rate of relative movement between said members.

3. A hydropneumatic seat suspension strut comprising a piston and a cylinder arranged for relative rectilinear reciprocable movement, a pressure chamber of variable volume defined by said piston and cylinder, cooperable means on said piston and cylinder for admitting and discharging hydraulic fluid under pressure from said pressure chamber, an accumulator including a first chamber containing a gaseous fluid under pressure and a second chamber communicating with said pressure chamber, and a valve mechanism between said pressure chamber and said second chamber for establishing different values of flow rate of the hydraulic fluid from said pressure chamber to said second chamber, such values of flow rate being dependent upon the rate of relative movement between said chambers.

4. A hydropneumatic suspension device for a vehicle seat of the type including telescoping member defining a chamber for containing hydraulic fluid under pressure which is admitted to and discharged from said chamber in response to the retraction and extension, respectively, of said members the improvement comprising an accumulator, a free piston in said accumulator providing variable volume chambers, one of said chambers containing a gaseous fluid under pressure and the other containing hydraulic fluid, a conduit connecting said other chamber of said accumulator and the chamber defined by said telescoping members, and a valve mechanism in said conduit, said valve mechanism including a flow control device which is operable in response to sudden increases in pressure in said first mentioned chamber occasioned by sudden retraction of said members for permitting flow of hydraulic fluid from said first mentioned chamber to said other chamber thus moving said free piston in a direction increasing the pressure of the gaseous fluid with said increase being effective to supply a progressively increasing resistance to the retraction of said members.

5. A hydropneumatic vehicle seat supporting strut including a pair of telescoping members one of which is mounted on the floor of the vehicle and the other to the seat, a source of pressure fluid connected to one of said members, said members being formed to define chambers for receiving pressure fluid which is effective to maintain a predetermined elongation of said strut to locate the seat a desired distance above the floor, cooperable means on said member for controlling the flow of pressure fluid to and from said chambers, an accumulator having a movable boundary wall defining chamber portions one of which is filled with a gaseous fluid under pressure and the other being in communication with said chamber of the strut, and a valve mechanism including an orifice for establishing rates of flow of pressure fluid from said chambers to said other chamber of said accumulator with such rates of flow being responsive to the rate of relative movement between said members, said chamber portion containing gaseous fluid under pressure being operable to progressively increase the pressure of the fluid derived from said chambers of said strut and thus oppose the movement between said members.

6. A hydropneumatic strut for a vehicle seat comprising: a cylinder secured to a stationary surface, a piston reciprocably mounted in said cylinder and having an outwardly projecting end pivotally connected to the seat, said piston and cylinder defining an exhaust passage connected to the tank of a hydraulic circuit and a pressure passage connected to a pressure conduit of such hydraulic circuit, said piston and cylinder further defining communicating first and second chambers of variable volume, fluid passageways in said rod being operable to establish communication of said chambers with said exhaust and pressure passages in response to the reciprocation of said cylinder relative to said rod, said fluid passageway including an orifice for throttling the fluid admitted to and discharged from the first of said chambers, an accumulator including a free piston forming variable volume cavities with a first of said cavities being charged with a gaseous fluid under pressure, a dual-rate orifice type check valve and an orifice in a conduit connecting the second of said cavities to the first one of said communicating chambers, said accumulator and said check valve being effective in conjunction with said first chambers to resist reciprocation of said rod during reciprocation of said cylinder by receiving fluid displaced from said first chamber at a rate determined by the rate at which said cylinder moves relative to said rod.

References Cited by the Examiner
UNITED STATES PATENTS 3,168,278 2/1965 Ogden _____ 267—1
3,179,432 4/1965 Chanceon _____ 280—6

ARTHUR L. LA POINT, *Primary Examiner.*

R. M. WOHLFARTH, *Assistant Examiner.*